(12) United States Patent
Dick et al.

(10) Patent No.: US 7,158,635 B2
(45) Date of Patent: Jan. 2, 2007

(54) GENERATION OF USER EQUIPMENT IDENTIFICATION SPECIFIC SCRAMBLING CODE FOR THE HIGH SPEED SHARED CONTROL CHANNEL

(75) Inventors: Stephen G. Dick, Nesconset, NY (US); Nader Bolourchi, Larchmont, NY (US); Sung-Hyuk Shin, Fort Lee, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 781 days.

(21) Appl. No.: 10/328,575

(22) Filed: Dec. 23, 2002

(65) Prior Publication Data

US 2004/0057401 A1   Mar. 25, 2004

Related U.S. Application Data

(60) Provisional application No. 60/378,170, filed on May 13, 2002, provisional application No. 60/378,509, filed on May 7, 2002.

(51) Int. Cl.
*H04K 1/00* (2006.01)
*H04L 9/00* (2006.01)

(52) U.S. Cl. ............................ 380/28; 380/43; 713/162
(58) Field of Classification Search ................. 398/89, 398/78; 380/260, 259; 713/162
See application file for complete search history.

(56) References Cited

U.S. PATENT DOCUMENTS

| | | | | |
|---|---|---|---|---|
| 3,569,956 | A * | 3/1971 | Duffy | .......................... 341/95 |
| 5,671,218 | A | 9/1997 | I et al. | |
| 5,799,154 | A | 8/1998 | Kuriyan | |
| 6,014,567 | A | 1/2000 | Budka | |
| 6,385,183 | B1 | 5/2002 | Takeo | |
| 6,493,331 | B1 | 12/2002 | Walton et al. | |
| 6,539,047 | B1 | 3/2003 | Moon | |
| 6,567,461 | B1 | 5/2003 | Moon et al. | |
| 6,731,618 | B1 * | 5/2004 | Chung et al. | ................ 370/328 |
| 6,871,313 | B1 * | 3/2005 | Gopaiakrishnan | ........... 714/774 |
| 6,917,603 | B1 * | 7/2005 | Strawczynski et al. | ...... 370/336 |
| 2002/0018565 | A1 | 2/2002 | Luttrell et al. | |
| 2002/0044542 | A1 | 4/2002 | Kim et al. | |
| 2002/0075838 | A1 * | 6/2002 | Choi et al. | ................... 370/342 |
| 2002/0075964 | A1 * | 6/2002 | Okumura | .................... 375/259 |
| 2002/0114268 | A1 * | 8/2002 | Kim et at. | ................... 370/208 |

(Continued)

FOREIGN PATENT DOCUMENTS

GB          22592226 A  *  3/1993

(Continued)

OTHER PUBLICATIONS

InterDigital Comm. Corp., "16 bit UE ID Based UE Specific Masking for HS-SCCH,"Discussion and Decision, 3GPP TSG RAN WG1#26, Kyung-Ju, Korea, May 13-17, 2002.

(Continued)

*Primary Examiner*—Kambiz Zand
*Assistant Examiner*—Thomas M. Szymanski
(74) *Attorney, Agent, or Firm*—Volpe and Koenig, PC (57) ABSTRACT

The present invention provides embodiments for producing a user equipment identification scrambling sequence (UEIDSS). The produced sequences for different user identification codes have a high separation. A base station uses the UEIDSS to scramble a high speed shared control channel (HS-SSCH) and a user equipment (UE) uses the UEIDSS to descramble the HS-SSCH. The embodiments utilize various blocks for producing the codes. These blocks include Reed-Muller encoding, concatenation, rate matching, segmentation, convolutional encoding, tail bit discarding, zero padding, repeating, CRC calculation, quadratic residue coding, parity-check bit, shortening, puncturing and BCH encoding blocks.

7 Claims, 5 Drawing Sheets

U.S. PATENT DOCUMENTS

2003/0048800 A1* 3/2003 Kilfoyle et al. ............. 370/441
2003/0074476 A1 4/2003 Kim et al.
2005/0063347 A1* 3/2005 Sarkkinen et al. .......... 370/338

FOREIGN PATENT DOCUMENTS

KR 200163271 7/2001

OTHER PUBLICATIONS

3GPP TR 25.858, "Technical Specification Group Radio Access Network; High Speed Downlink Packet Access; Physical Layer Aspects," 3rd Generation Partnership Project; V5.0.0, 3GPP, (Release 5) Mar. 2002, pp. 1-31.

InterDigital Comm. Corp., "16 bit UE ID based UE Specific Masking for HS-SCCH: Updated for consistency with new Rate matching for HS-SCCH,"Discussion and Decision, 3GPP TSG RAN WG1#27, Olou, Finland, Jul. 2-5, 2002.

"3rd Generation Partnership Project: Technical Specification Group Radio Access Network; Multiplexing and channel coding (FDD) (Release 5)," 3GPP TS 25.212 v5. 1.0-DRAFT, Jun. 2002.

Lucent Technologies, "Way forward on HS-SCCH coding," 3GPP TSG-RAN WG1#25, Apr. 2002, R1-02-0553, pp. 1-6.

Lucent Technologies, "Pre-coding of UE ID before Modulo 2 addition with CRC," 3GPP TSG-RAN WG1#125, Apr. 2002, R1-02-055.

Nokia, "Channel coding and error detection for HS-SCCH," TSG-RAN WG1 #23, 3GPP, Jan. 2002, R1-02-0016.

InterDigital Comm. Corp., "16 bit UE ID BAsed UE Specific Masking for HS-SCCH," 3GPP TSG RAN WG1#26, May 2002, R1-02-0715.

3GPP TR 25.858, "Technical Specification Group Radio Access Network; High Speed Downlink Packet Access; Physical Layer Aspects," 3rd Generation Partnership Project; V5.0.0, 3GPP, (Release 5) Mar. 2002, pp. 1-31.

TSG RAN WG1 Meeting #24, "Performance of the HS-SCCH", Motorola, http://www.3qpp.org/ftp/TSG_RAN/WG1_RL1/TSGR1_/Docs/Zips/R1-02-0610.zip, Apr. 2002.

"3rd Generation Partnership Project; Technical Specification Group Radio Access Network, Multiplexing and Channel Coding (FDD) (Release 5)", 3GPP TS 25.212 V5.0.0, Mar. 2002.

InterDigital Comm. Corp., "16 bit UE ID Based UE Specific Masking for HS-SCCH," Discussion and Decision, 3GPP TSG RAN WG1#26, Kyung-Ju, Korea, May 13-17, 2002.

Siemens, "Simplified UE-ID Masking of HS-SCCH, Part 1," Discussion and Decision, TSG-RAN Working Group 1 #27, Oulu, Finland, Jul. 2-5, 2002.

InterDigital Comm. Corp., "16 bit UE ID based UE Specific Masking for HS-SCCH: Updated for consistency with new Rate matching for HS-SCCH," Discussion and Decision, 3GPP TSG RAN WG1#27, Olou, Finland, Jul. 2-5, 2002.

"3rd Generation Partnership Project: Technical Specification Group Radio Access Network; Multiplexing and channel coding (FDD) (Release 5),"3GPP TS 25.212 v5. 1.0-DRAFT, Jun. 2002.

* cited by examiner

GENERATION OF USER EQUIPMENT IDENTIFICATION SPECIFIC SCRAMBLING CODE FOR THE HIGH SPEED SHARED CONTROL CHANNEL

This application claims priority to U.S. Provisional Application No. 60/378,170, filed May 13, 2002 and to U.S. Provisional Application No. 60/378,509, filed May 7, 2002.

BACKGROUND

The present invention relates to wireless communication systems. More particularly, the present invention relates to user equipment identification specific scrambling sequences for high speed shared control channels (HS-SCCH).

High speed downlink packet access (HSDPA) is proposed for wideband code division multiple access (W-CDMA) communication systems. HSDPA allows for high downlink data rates to support multimedia services.

To support HSDPA, high speed shared control channels (HS-SCCHs) are used. The HS-SCCHs are used to signal vital control information to the user equipments (UEs). Each HS-SCCH has two parts, referred to as Part-1 and Part-2. Part-1 carries time critical information needed by the UE. This information includes the channelization code set and the modulation type used by the associated high speed downlink shared channel (HS-DSCH). This information is vital to support HSDPA, since HSDPA uses adaptive modulation and coding (AM&C).

To obtain its Part-1 information, each HSDPA UE monitors up to four HS-SCCHs for its information. The information for a particular UE is distinguished from other UEs by its UE identification (UE ID) scrambling sequence. The UE processes each monitored HS-SCCH with its UE ID scrambling sequence to detect its UE ID scrambling sequence on the HS-SCCHs. After processing, the UE determines on which HS-SCCH, if any, information was carried using its scrambling sequence. The UE descrambles the data carried on its HS-SCCH using its scrambling sequence.

Although it is proposed to extend the UE ID length to a 16 bit sequence, the current proposal for the HS-SCCHs uses a 10 bit UE ID. This UE ID is converted into a 40 bit scrambling sequence. To turn the 10 bit UE ID into the 40 bit scrambling sequence, the 10 bit UE ID is processed by a Reed-Muller encoding block to produce a 32 bit code. The first 8 bits of the produced code are repeated and appended onto the back of the 32 bit code to produce a 40 bit code.

To reduce the occurrence of false detections, it is desirable to have good separation between the produced scrambling codes for each UE ID. Accordingly, it is desirable to have alternate approaches to producing scrambling codes.

SUMMARY

The present invention provides embodiments for producing a user equipment identification scrambling sequence (UEIDSS). The produced sequences for different user identification codes have a high separation. A base station uses the UEIDSS to scramble a high speed shared control channel (HS-SSCH) and a user equipment (UE) uses the UEIDSS to descramble the HS-SSCH. The embodiments utilize various blocks for producing the codes. These blocks include Reed-Muller encoding, concatenation, rate matching, segmentation, convolutional encoding, tail bit discarding, zero padding, repeating, CRC calculation, quadratic residue coding, parity-check bit, shortening, puncturing and BCH (Bose, Chaudhuri, and Hocquenghem) encoding blocks.

DESCRIPTION OF THE PREFERRED EMBODIMENTS

Although the preferred embodiments are described in conjunction with the preferred application of the invention for use with the HSDPA of the third generation partnership project (3GPP) wideband code division multiple access (W-CDMA) communication system, the invention can be applied to other code division multiple access communication systems. Although the UE ID can be of any bit length L, such as 8, 10 or 16 bits, the preferred embodiments illustrate using a 16 bit UE ID as proposed for the HSDPA for the 3GPP W-CDMA system.

Figure 1:
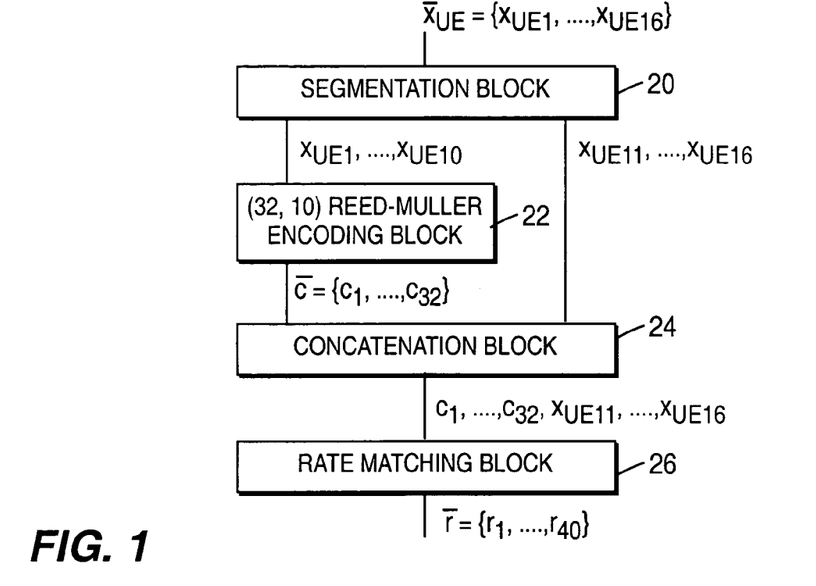
FIG. 1 is an embodiment of a user equipment identification (UE ID) scrambling sequence generation circuit using a segmentation, Reed Muller encoding, concatenation and rate matching blocks.

FIG. 1 is one UE ID scrambling sequence generation circuit. A UE ID, $x_{UE}$, of length 16, or L in general, is input into the circuit. The UE ID, $x_{UE}=\{x_{UE1}, \ldots, x_{UE16}\}$, is input into a segmentation block 20. The segmentation block 20 divides the bits of the UE ID into two segments. One segment (first segment) is of length 10, or in general N, and the other (second segment) is of length 6, or in general L-N. A (32,10), or in general (K,N), Reed-Muller encoding block 22 encodes the first segment, producing an encoded first segment, $c=\{c_1, \ldots, c_{32}\}$. After encoding, a concatenation block 24 adds to the end of the encoded first segment the unencoded second segment, $c_1, \ldots, c_{32}, x_{ue11}, \ldots, x_{ue16}$. After the concatenation, the concatenated code is rate matched by a rate matching block 26 to the desired length, such as to 40 bits, $r=\{r_1, r_2, \ldots, r_{40}\}$.

Figure 2:
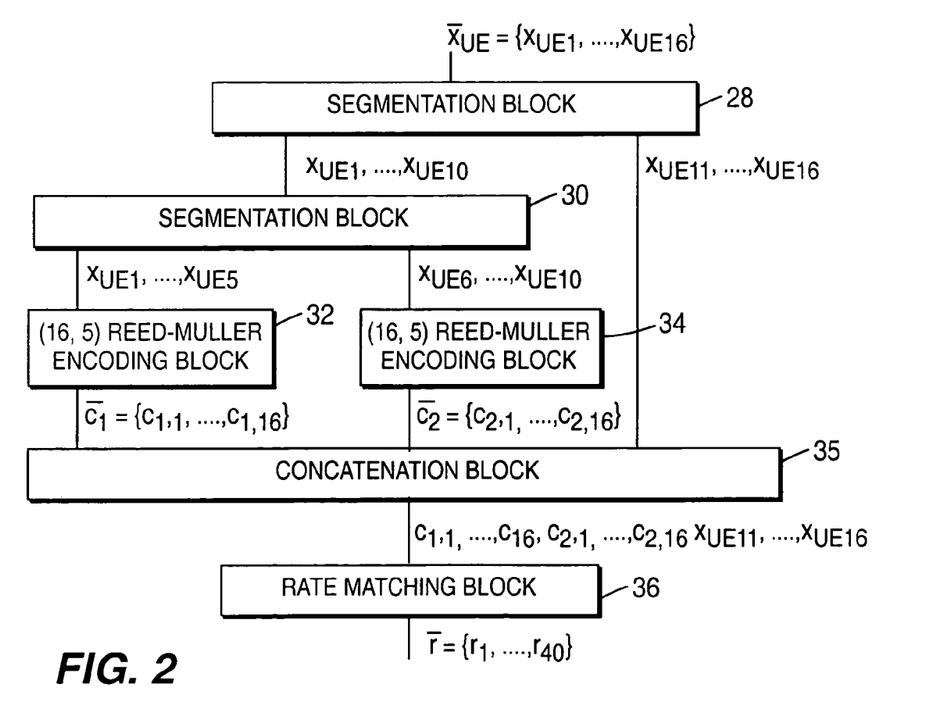
FIG. 2 is an embodiment of a UE ID scrambling sequence generation circuit using two segmentation, two Reed Muller encoding, concatenation and rate matching blocks.

FIG. 2 is a second UE ID scrambling sequence generation circuit. A UE ID, $x_{UE}$, of length 16, or L in general, is input into the circuit. The UE ID, $x_{UE}=\{x_{UE1}, \ldots, x_{UE16}\}$, is input into a segmentation block 28. The segmentation block 28 divides the bits of the UE ID into two segments. One segment (first segment) is of length 10, or in general N, and the other is of length 6, or in general L−N. The first segment is segmented by a second segmentation block 30 into two sub-segments of length 5, or in general N1 for a first sub-segment and N−N1 (or N2) for a second sub-segment. Each sub-segment is sent through a Reed-Muller encoding block 32, 34. The first sub-segment is encoded by a (16, 5), or in general (K1, N1), Reed-Muller encoding block 32 and the second sub-segment is encoded by a (16, 5), or in general (K2, N2), Reed-Muller encoding block 34. After encoding, the two encoded sub-segments, $c_1=\{c_{1,1}, \ldots, c_{1,16}\}$ and $c_2=\{c_{2,1}, \ldots, c_{2,16}\}$, and the unencoded second segment, $x_{ue11}, \ldots x_{UE16}$ are concatenated by a concatenation block 34 to produce a concatenated sequence $c_{1,1}, \ldots, c_{1,16}, c_{2,1}, \ldots, c_{2,16}, x_{ue11}, \ldots, x_{UE16}$. After the concatenation, the concatenated code is rate matched by a rate matching block 36 to the desired length, such as to 40 bits, $r=\{r_1, \ldots, r_{40}\}$.

Figure 3:
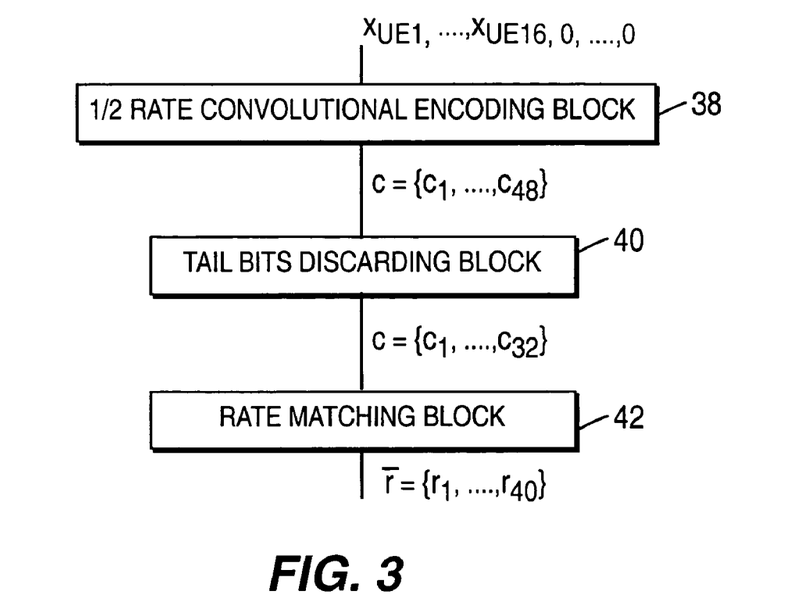
FIG. 3 is an embodiment of a UE ID scrambling sequence generation circuit using ½ rate convolutional encoding, tail bits discarding and rate matching blocks.

FIG. 3 is a third UE ID scrambling sequence generation circuit. A UE ID, $x_{UE}$, of length 16, or L in general, followed by 8 zeros (tail bits), or Z in general, is input into a ½ rate convolutional encoder 38. 16, or in general T, tail coded bits, of the convolutionally encoded sequence, $c=\{c_1, \ldots, c_{48}\}$, are discarded by a tail bit discarding block 40. The resulting sequence, $c_1, \ldots, c_{32}$ is rate matched by a rate matching block 42 to a desired number of bits, such as 40 bits, $r=\{r_1, \ldots, r_{40}\}$.

Figure 4:
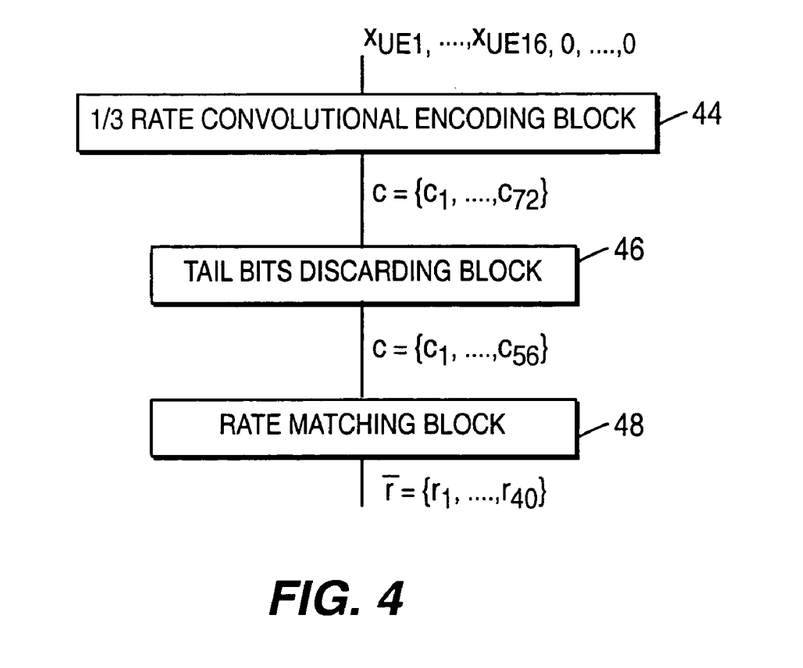
FIG. 4 is an embodiment of a UE ID scrambling sequence generation circuit using ⅓ rate convolutional encoding, tail bits discarding and rate matching blocks.

FIG. 4 is a fourth UE ID scrambling sequence generation circuit. A UE ID, $x_{UE}$, of length 16, or L in general, followed by 8 zeros (tail bits), or in general Z, are input into a ⅓ rate convolutional encoder 44. 16, or in general T, tail coded bits, of the convolutionally encoded sequence, $c=\{c_1, \ldots, c_{72}\}$, are discarded by a tail bits discarding block 46. The resulting sequence is punctured, such as by 32 bits, by a puncturing block (rate matching block 48) to a desired number of bits, such as 40 bits, $r=\{r_1, \ldots, r_{40}\}$.

Figure 5:
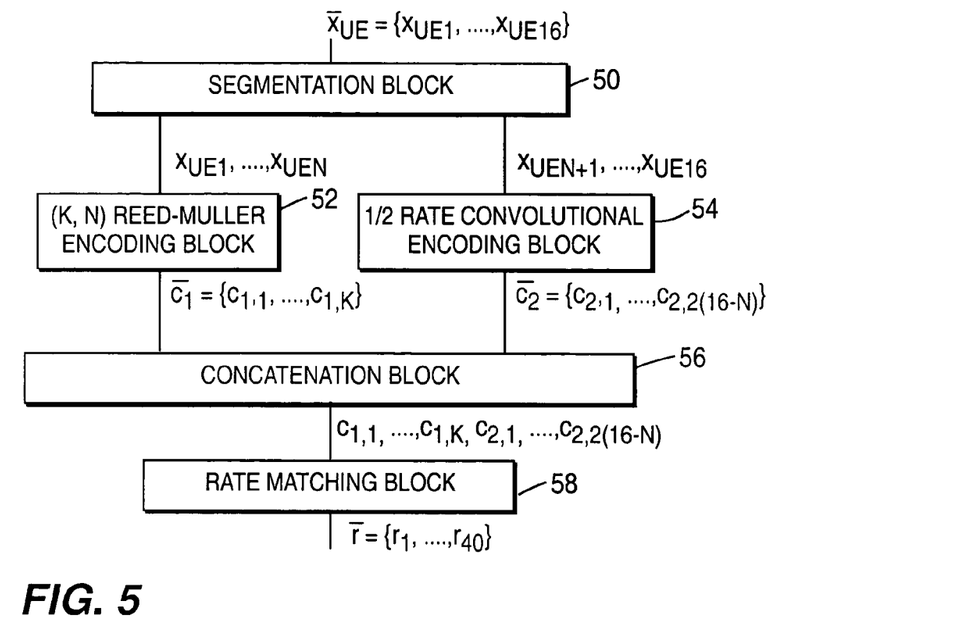
FIG. 5 is an embodiment of a UE ID scrambling sequence generation circuit using segmentation, Reed-Muller encoding, ½ rate convolutional encoding, concatenation and rate matching blocks.

FIG. 5 is a fifth UE ID scrambling sequence generation circuit. A UE ID, $x_{UE}$, of length 16, or L in general, is input into a segmentation block 50. The segmentation block 50 divides the bits of the UE ID into two segments. One segment (first segment) is of length N and the other is of length 16−N, or L−N in general. A preferred range for N is from 1 to 10 for a 16 bit UE ID. The first segment is sent through a Reed-Muller encoding block 52. The first segment is encoded by a (K, N) Reed-Muller encoding block 52, producing a first sequence $c_1=\{c_{1,1}, \ldots, c_{1,K}\}$. Preferred values for K are 4, 8, 16 and 32. The second segment is encoded by a ½ rate convolutional encoding block 54, producing a sequence $c_2=\{c_{2,1}, \ldots, c_{2,2}(16-N)\}$. After encoding, the two encoded segments are concatenated by a concatenation block 56 to produce a concatenated sequence $c_{1,1}, \ldots, c_{1,K}, c_{2,1}, \ldots, c_{2,2}(16-N)$. After the concatenation, the concatenated code is rate matched by a rate matching block 58 to the desired length, such as to 40 bits, $r=\{r_1, \ldots, r_{40}\}$.

Figure 6:
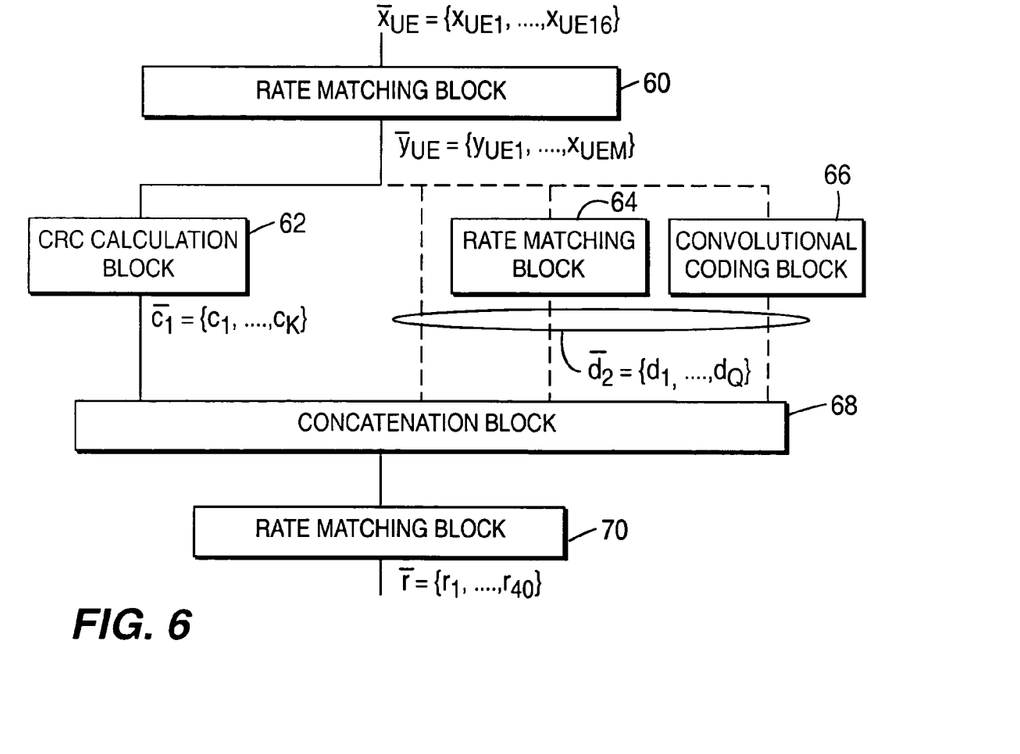
FIG. 6 is an embodiment of a UE ID scrambling sequence generation circuit using two rate matching, concatenation and one of Reed-Muller encoding, convolutional encoding or no coding blocks.

FIG. 6 is a sixth UE ID scrambling sequence generation circuit. A UE ID, $x_{UE}$, of length 16, or L in general, is input into a rate matching block 60 to produce an M bit sequence, $y_{UE}=\{y_{UE1}, \ldots, y_{UEM}\}$. For a 16 bit UE ID a preferred value for M is 32. The rate matched sequence is processed by a circular redundancy code (CRC) calculation block 62. The CRC calculation block 62 produces a CRC of length K, $c=\{c_1, \ldots, c_K\}$. Preferred values for K are 8, 12, 16 and 24. The UE ID is either channel coded, such as by using a Reed-Muller block 64 or a convolutional coding block 66, or not coded at all. The channel coded or non-coded sequence may or may not be repeated, resulting in sequence $d=\{d_1, \ldots, d_Q\}$. The two sequences are concatenated by a concatenation block 68, producing a concatenated sequence, such as $c_1, \ldots, c_K, d_1, \ldots, d_Q$. To illustrate, a repeated uncoded 16 bit UE ID may be repeated and concatenated with an 8 bit CRC producing a concatenated sequence of $x_{UE1}, \ldots, x_{UE16}, c_1, \ldots, c_8, x_{UE1}, \ldots, x_{UE16}$. After the concatenation, the concatenated code is rate matched by a rate matching block 70 to the desired length, such as to 40 bits, $r=\{r_1, \ldots, r_{40}\}$.

Figure 7:
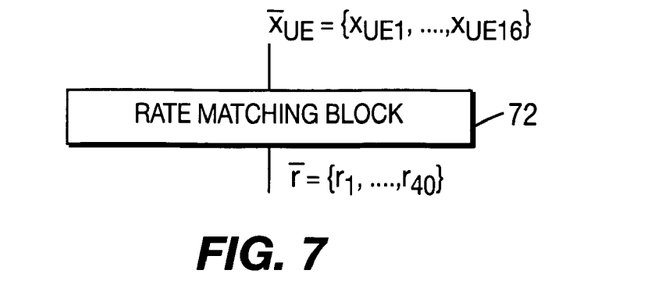
FIG. 7 is an embodiment of a UE ID scrambling sequence generation circuit using a rate matching block.

FIG. 7 is a seventh UE ID scrambling sequence generation circuit. A UE ID, $x_{UE}$, of length 16, or L in general, is input into a rate matching block 72 to directly produce a sequence of a desired length, such as to 40 bits, $r=\{r_1, \ldots, r_{40}\}$.

Figure 8:
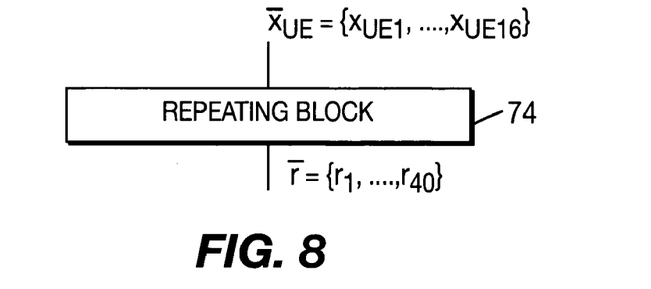
FIG. 8 is an embodiment of a UE ID scrambling sequence generation circuit using a repeating block.

FIG. 8 is an eighth UE ID scrambling sequence generation circuit. A UE ID, $x_{UE}$, of length 16, or L in general, is input into a repeat block to repeat the UE ID to a desired length, such as to 40 bits, $r=\{r_1, \ldots, r_{40}\}$. To illustrate, one preferred repeated sequence is as follows, $x_{UE1}, \ldots, x_{UE16}, x_{UE1}, \ldots, x_{UE16}, x_{UE1}, \ldots, x_{UE8}$.

Preferably, the UE ID scrambling sequence generation encoding circuits of FIGS. 1–8, utilize coding blocks already available in a 3GPP W-CDMA UE or base station. By utilizing the existing coding blocks, new hardware or software algorithms are not required for the coding blocks, reducing the implementation cost for the HSDPA.

Figure 9:
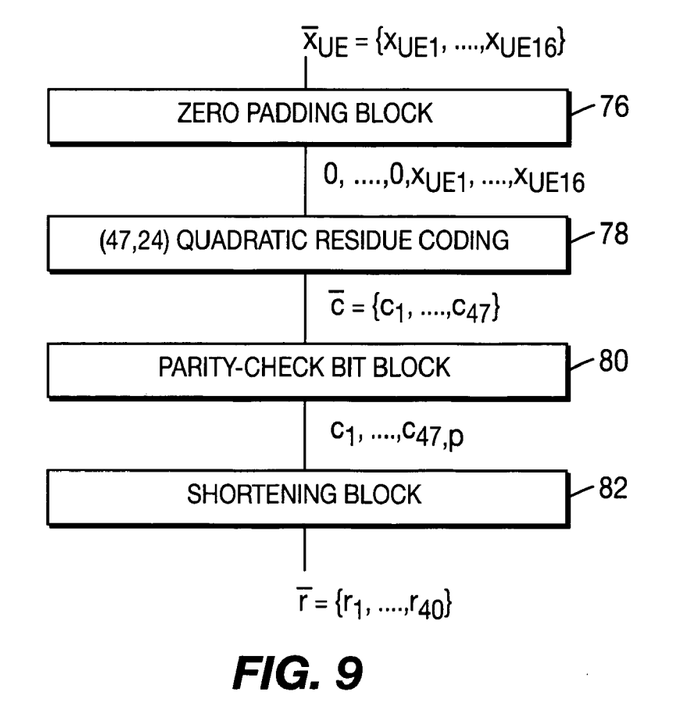
FIG. 9 is an embodiment of a UE ID scrambling sequence generation circuit using zero padding, quadratic residue coding, parity-check bit and shortening blocks.

FIG. 9 is a ninth UE ID scrambling sequence generation circuit. A UE ID, $x_{UE}$, of length 16, or L in general, is input into a zero padding block 76. The zero padding block 76 pads the UE ID with 8 zeros, or in general Z zeros, to produce a zero padded sequence, $0,0,0,0,0,0,0,0, x_{UE1}, \ldots, x_{UE16}$. A (47, 24), or in general (K,N), quadratic residue coding block 78 encodes the padded sequence with a quadratic residue code to produce a coded sequence, $c=\{c_1, \ldots, c_{47}\}$. A parity-check bit block 80 appends a parity bit, p, to the coded sequence to produce the sequence $c_1, \ldots, c_{47}, p$. One type of parity bit is an even or odd parity bit, although other types of parity bits may be used. That sequence is shortened by a shortening block 82 to the desired length, such as to 40 bits, $r=\{r_1, \ldots, r_{40}\}$. Using the preferred (48, 24) quadratic code results in a minimum distance of 12, prior to shortening, providing a wide separation between the codes.

Figure 10:
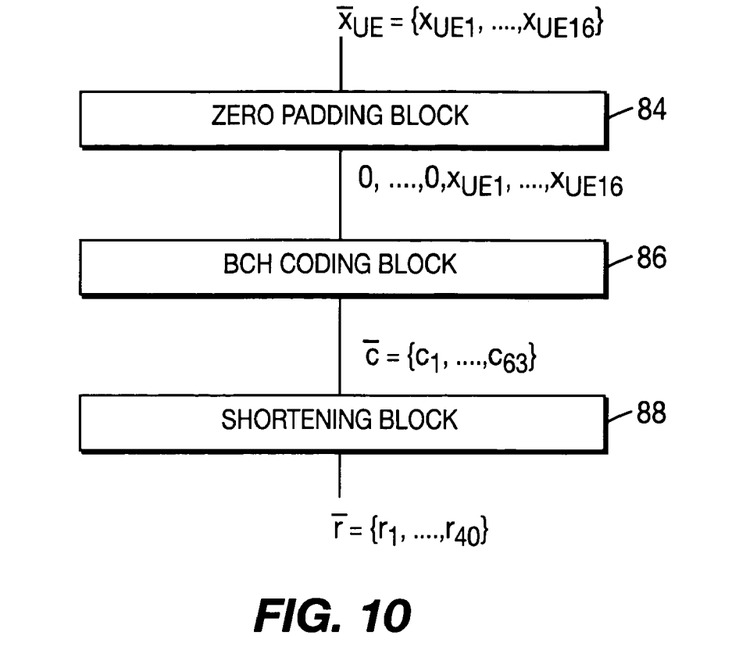
FIG. 10 is an embodiment of a UE ID scrambling sequence generation circuit using a zero padding, BCH encoding and shortening blocks.

FIG. 10 is a tenth UE ID scrambling sequence generation circuit. A UE ID, $x_{UE}$ of length 16, or L in general, is input into a zero padding block 84. The zero padding block 84 pads the UE ID with 23 zeros, or in general Z zeros, to produce a zero padded sequence, $0, \ldots, 0, x_{UE1}, \ldots, x_{UE16}$. A (63, 39), or (K, N) in general, BCH encoding block 86 encodes the padded sequence using a BCH code to produce an encoded sequence, $c=\{c_1, \ldots, c_{63}\}$. The encoded sequence is shortened by a shortening block 88 to the desired length, such as to 40 bits, $r=\{r_1, \ldots, r_{40}\}$. This approach provides for a minimum distance of 9 between the scrambling codes.

Figure 12:
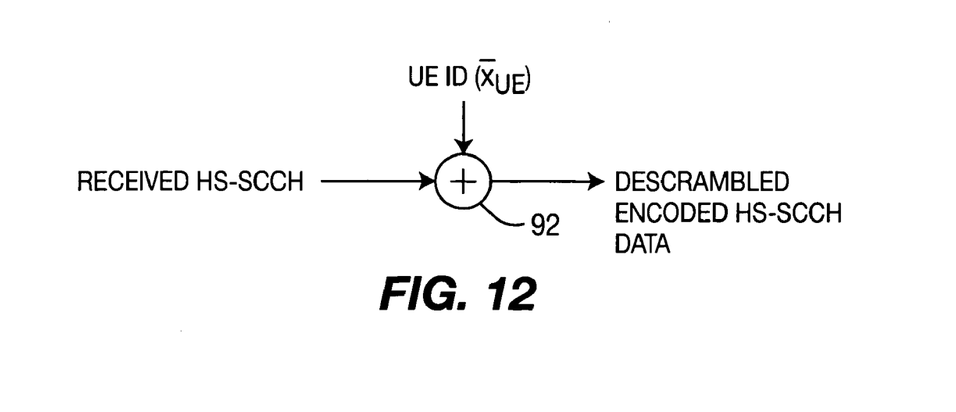
FIG. 12 is a simplified user equipment using the UE ID scrambling code.

Using the UE ID derived scrambling codes, the UE and base station can scramble and descramble the HS-SCCH. FIG. 12 is a simplified diagram of a user equipment descrambling a HS-SCCH. The UE ID scrambling code is mixed, such as by exclusive-or gate 90, with the received HS-SCCH for use in recovering the encoded HS-SCCH data.

Figure 11:
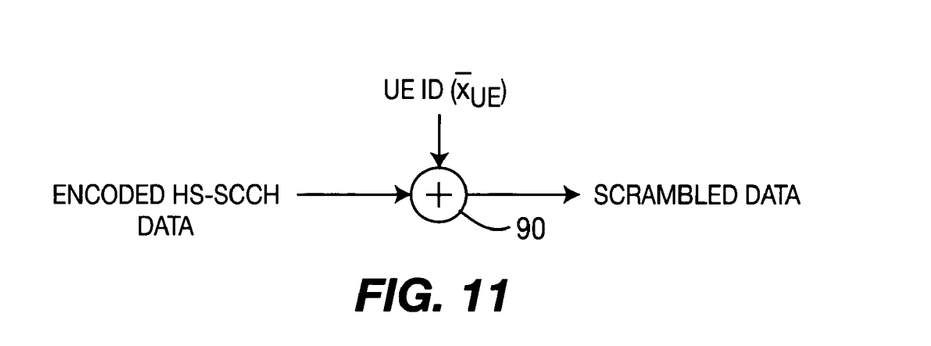
FIG. 11 is a simplified base station using the UE ID scrambling code.

FIG. 11 is a simplified diagram of a base station scrambling encoded data with the UE ID scrambling code for transfer over the HS-SCCH. The encoded data is mixed with the UE ID scrambling code, such as by an exclusive-or gate 92, for a particular user. The scrambled data is used to produce the HS-SCCH for transfer to the particular user.

What is claimed is:

1. A user equipment identification (UE ID) scrambling sequence generation device comprising:
    an input lead configured to receive an L bit UE ID signal;
    a segmentation device in communication with the input lead, configured to separate the L bit UE ID signal into an N bit sequence and a L–N bit sequence;
    a Reed-Muller encoding device in communication with the segmentation device, configured to encode the N bit sequence as a K bit encoded sequence;
    a concatenation device in communication with the Reed-Muller encoding device, configured to concatenate the K bit encoded sequence with the L–N bit sequence to produce a concatenated sequence; and
    a rate matching device in communication with the concatenation device, configured to rate match the concatenated sequence to produce a user equipment identification scrambling sequence of a desired length for use in descrambling a high speed shared control channel (HS-SCCH).

2. The UE ID scrambling sequence generation device of claim 1 wherein L is 16.

3. The UE ID scrambling sequence generation device of claim 1 wherein N is 10.

4. The UE ID scrambling sequence generation device of claim 3 wherein K is 32.

5. The UE ID scrambling sequence generation device of claim 1 wherein the desired length is 40 bits.

6. The UE ID scrambling sequence generation device of claim 1 further comprising a mixer for mixing the user equipment identification scrambling sequence with the HS-SCCH to recover data of the HS-SCCH.

7. The UE ID scrambling sequence generation device of claim 6 wherein the mixer is an Exclusive-or gate.

* * * * *

UNITED STATES PATENT AND TRADEMARK OFFICE
CERTIFICATE OF CORRECTION

PATENT NO. : 7,158,635 B2  
APPLICATION NO. : 10/328575  
DATED : January 2, 2007  
INVENTOR(S) : Dick et al.

Page 1 of 1

It is certified that error appears in the above-identified patent and that said Letters Patent is hereby corrected as shown below:

On the title page:

At section (56), U.S. PATENT DOCUMENTS, page 1, right column, line 6, after "6,871,313 B1 * 3/2005", delete "Gopaiakrishnan" and insert therefor --Gopalakrishnan--.

At section (56), U.S. PATENT DOCUMENTS, page 1, right column, line 9, after "2002/0044542 A1 4/2002", delete "Kim et al." and insert therefor --Kim--.

At section (56), OTHER PUBLICATIONS, page 2, right column, line 9, after "Motorola", delete "http://www.3qpp.org/ftp/TSG_RAN/WG1_RL1/" and insert therefor --http://www.3gpp.org/ftp/TSG_RAN/WG1_RL1/--.

At column 1, line 62, before the words "and a user", delete "(HS-SSCH)" and insert therefor --(HS-SCCH)--.

At column 1, line 63, before the words "The embodiments", delete "(HS-SSCH)" and insert therefor --(HS-SCCH)--.

At claim 1, column 5, line 16, before "L–N", delete "a" and insert therefor --an--.

Signed and Sealed this

Twenty-ninth Day of April, 2008

JON W. DUDAS  
*Director of the United States Patent and Trademark Office*